US012608863B2

(12) United States Patent
Neely

(10) Patent No.: US 12,608,863 B2
(45) Date of Patent: Apr. 21, 2026

(54) METHODS AND SYSTEMS FOR DETERMINING PAST AND FUTURE CYCLES OF SCENES THAT EMPLOY LOOPING FUNCTIONS

(71) Applicant: SPATIALX INC., Scottsdale, AZ (US)

(72) Inventor: Shawn R. Neely, Oakland, CA (US)

(73) Assignee: SPATIALX INC., Scottsdale, AZ (US)

( * ) Notice: Subject to any disclaimer, the term of this patent is extended or adjusted under 35 U.S.C. 154(b) by 192 days.

(21) Appl. No.: 18/118,683

(22) Filed: Mar. 7, 2023

(65) Prior Publication Data

US 2023/0281899 A1     Sep. 7, 2023

Related U.S. Application Data

(60) Provisional application No. 63/268,956, filed on Mar. 7, 2022.

(51) Int. Cl.
*G06T 13/00* (2011.01)
*G06F 7/58* (2006.01)

(52) U.S. Cl.
CPC .............. *G06T 13/00* (2013.01); *G06F 7/588* (2013.01)

(58) Field of Classification Search
CPC ......... G06T 13/00; G06T 13/80; G06T 13/40; G06T 13/20; G06T 13/60; G06F 7/588; G11B 27/007
See application file for complete search history.

(56) References Cited

U.S. PATENT DOCUMENTS

| | | | |
|---|---|---|---|
| 7,990,388 B2 * | 8/2011 | Jones | G06T 13/00 345/475 |
| 10,127,632 B1 | 11/2018 | Burke et al. | |
| 2002/0008703 A1 * | 1/2002 | Merrill | G06F 8/00 345/473 |
| 2003/0156113 A1 * | 8/2003 | Freedman | G11B 27/11 345/473 |
| 2006/0122842 A1 | 6/2006 | Herberger et al. | |

(Continued)

OTHER PUBLICATIONS

International Search Report and Written Opinion of the International Searching Authority dated May 17, 2023 as received in Application No. PCT/US2023/014744.

(Continued)

*Primary Examiner* — Devona E Faulk
*Assistant Examiner* — Donna J. Ricks
(74) *Attorney, Agent, or Firm* — Maschoff Brennan

(57) ABSTRACT

Methods and systems for determining past and future cycles of scenes that employ looping functions are disclosed. In one embodiment, a scene that includes a repeating segment may be created. The repeating segment may have a finite duration and may be separated into an identified number of looped cycles. Each looped cycle in the repeating segment may include a rendering of an animation and each looped cycle in the repeating segment may include a randomized loop delay such that a time between renderings of the animation within each looped cycle is not consistent. A duration of each looped cycle in the scene repeating segment may be aggregated to determine a total length of time of the repeating segment. Finally, the looped cycle in the scene that is active at a specified time may be determine based on the total length of time of the repeating segment.

17 Claims, 6 Drawing Sheets

(56) References Cited

U.S. PATENT DOCUMENTS

2008/0273038 A1* 11/2008 Girard .................... G06T 13/40
345/474
2020/0037093 A1 1/2020 Cummings et al.
2021/0185382 A1 6/2021 Sangoli

OTHER PUBLICATIONS

European Search Report issued in corresponding application No. EP23767409, dated Feb. 10, 2026.

* cited by examiner

200

| Table Index (202) | Table Index (204) | Cumulative Loop Delay (206) | Loop Duration (208) | Cumulative Loop Duration (210) | |
|---|---|---|---|---|---|
| 0 | 3 | 3 | 13 | 13 | 212a |
| 1 | 9 | 12 | 19 | 32 | 212b |
| 2 | 7 | 19 | 17 | 49 | 212c |
| 3 | 1 | 20 | 11 | 60 | 212d |
| 4 | 5 | 25 | 15 | 75 | 212e |

| Table Index | Table Index | Cumulative Loop Delay | Animation Index | Animation Duration | Cumulative Animation Duration | Loop Duration | Cumulative Loop Duration |
|---|---|---|---|---|---|---|---|
| 502 | 504 | 506 | 508 | 510 | 512 | 514 | 516 |
| 0 | 3 | 3 | 0 | 10 | 10 | 13 | 13 |
| 1 | 9 | 12 | 2 | 4 | 14 | 13 | 26 |
| 2 | 7 | 19 | 1 | 5 | 19 | 12 | 38 |
| 3 | 1 | 20 | 0 | 10 | 29 | 11 | 49 |
| 4 | 5 | 25 | 2 | 4 | 33 | 9 | 58 |

METHODS AND SYSTEMS FOR DETERMINING PAST AND FUTURE CYCLES OF SCENES THAT EMPLOY LOOPING FUNCTIONS

CROSS REFERENCE TO RELATED APPLICATION

This application claims priority to U.S. Provisional Patent Application No. 63/268,956, filed on Mar. 7, 2022, which is incorporated herein by reference in its entirety.

FIELD

The embodiments discussed herein are related to methods and systems for determining a state of a looped cycle within a scene at a selected point in time.

BACKGROUND

Many environments are augmented with sensory systems in order to create or add to an ambiance to the location. For example, hospitality, retail, and wellness locations, such as restaurants, sports bars, health spas, hotels, etc., often include these systems. The sensory systems at these locations may present a scene or multiple scenes that include one or more animations. These animations may include sensory objects, such as a sound object, a visual object, and/or another sensory object. The scene(s) presented by these sensory systems may help create a desired environmental feel or add to an ambiance that is appropriate for the location.

Oftentimes, scenes in sensory systems include looped cycles, which may repeat periodically. A looped cycle may be a portion of a scene that is repeated. If a person is at a location long enough, the repeating nature of the looped cycles may be noticed, which may detract from the desired environmental feel and ambiance. In order to avoid this predictable repetition of looped cycles, some scenes insert randomized delays into the looped cycles and vary the durations that animations are rendered. Randomized delays may include, for example, variable delays between animations within the looped cycles. Randomized durations may include variable durations time that animations in each loop cycle are rendered. A random number generator may be used to identify these random delays and durations.

Introducing randomness and eliminating a predictable repetition of looped cycles within a scene can make the scene more realistic; however, it can also complicate determining the timing of animations in past and future looped cycles. In many current sensory systems, scenes do not include segments having defined durations. In other words, the looped cycles within a scene can run for as long as desired, with randomized delays and/or animation durations being determined individually for each looped cycle in the scene.

In these systems, to determine which looped cycle in the scene was or will be active at a specified time in the past or future or whether an animation will be rendered at that time, a simulation is required that calculates a duration time of each looped cycle individually using the same random number generator that is used to generate the randomized delays and durations. Depending on the length of the scene, these simulations may require a large number of computations and significant amount of processing power to determine what was or will be active at a specified time. As the length of the scene increases, the computational complexity also increases. Thus, a need exists for an improved system and method for determining what looped cycle and/or animation will be active at some point in a scene more efficiently and with less required processing power.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

In one embodiment, a method for determining a future or past cycle of a scene that employs a looping function is disclosed. The method may include creating a scene that includes a repeating segment. The repeating segment may have a finite duration and may be separated into an identified number of looped cycles. Each looped cycle in the repeating segment may include a rendering of an animation and each looped cycle in the repeating segment may include a randomized loop delay such that a time between renderings of the animation within each looped cycle is not consistent. The method may also include aggregating a duration of each looped cycle in the repeating segment to determine a total length of time of the repeating segment and determining which of the number of looped cycles in the scene is active at a specified time based on the total length of time of the repeating segment.

In some embodiments, the animation is an audible object or a visual object, or a combination of different sensory objects.

In some embodiments, a random number generator may be used to identify the loop delay, and the random number generator may be used to determine the total length of time of the repeating segment.

In some embodiments, each looped cycle in the repeating segment may have a duration that is equal to an amount of time between a start of a looped cycle and a start of a rendering of the animation, a duration time of the animation, and an amount of time between an end of the rendering of the animation and an end of the looped cycle. In these embodiments, the duration time of the rendering of the animation in each looped cycle may also be randomized, a random number generator may be used to identify the loop delay, the random number generator may be used to identify the duration time of the rendering of the animation in each looped cycle, and the random number generator may be used to determine the total length of time of the repeating segment.

In some embodiments whether the animation will be in a rendered state at the specified time may also be determined.

In some embodiments, one or more non-transitory computer-readable media may comprise one or more computer-readable instructions that, when executed by one or more processors of a computing device, cause the computing device to perform a method for determining a future or past cycle of a scene that employs a looping function.

In some embodiments, a computing device comprising one or more processors and one or more non-transitory computer-readable media comprising one or more computer-readable instructions that, when executed by the one or more processors, may cause the computing device to perform a method for determining a future or past cycle of a scene that employs a looping function.

The objects and/or advantages of the embodiments will be realized or achieved at least by the elements, features, and combinations particularly pointed out in the claims. It is to be understood that both the foregoing general description and the following detailed description are given as examples and explanatory and are not restrictive of the present disclosure, as claimed.

BRIEF DESCRIPTION OF THE DRAWINGS

Example embodiments will be described and explained with additional specificity and detail through the use of the accompanying drawings.

FIG. 2 illustrates an example table that may be used to determine a future or past cycle of a scene that employs a looping function;

FIG. 5 illustrates another example table that may be used to determine a future or past cycle of a scene that employs a looping function;

DESCRIPTION OF EMBODIMENTS

Figures 1A, 1B:
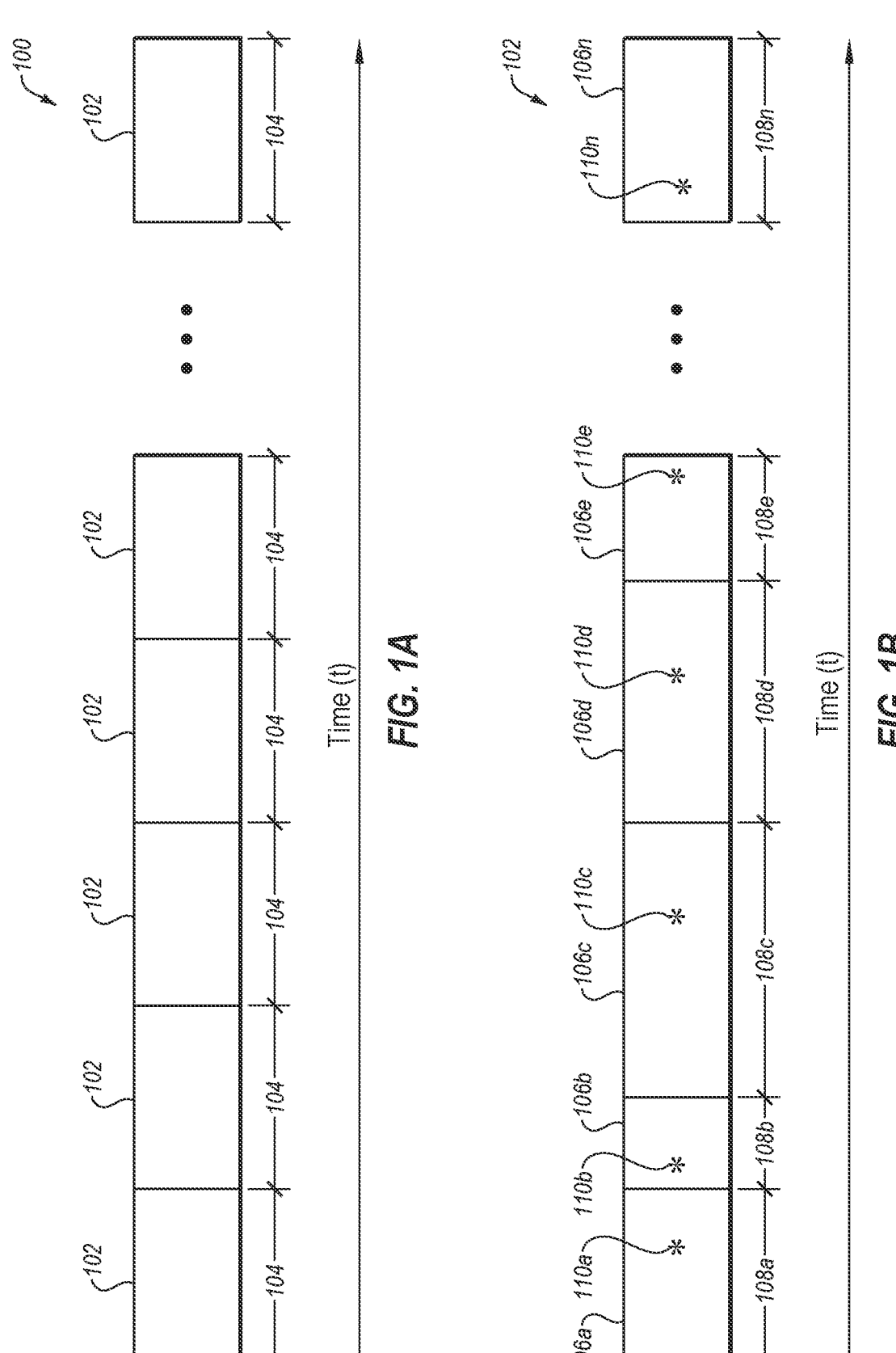
FIG. 1A illustrates an example scene in accordance with at least one embodiment described in the present disclosure.
FIG. 1B illustrates a segment of the scene illustrated in FIG. 1A.

Many environments are augmented with sensory systems in order to create or add to an ambiance at the location. For example, many wellness centers, such as health spas, use sensory systems to create a more relaxing environment. These sensory systems may present a scene that includes an animation. These animations may be sensory objects, such as audible objects, visual objects, odor objects, or other sensory objects. A scene may present one or more of these animations within a plurality of looped cycles. For example, a scene may include the sound of a bird chirping or a video of a forest with leaves falling from trees. A scene may include the sound of water splashing or a video of a beach with waves breaking. A sensory system may present more than one scene simultaneously in order to enhance the experience. For example, a sensory system may present a first scene having an audible object animation, such as a bird chirping, together with a second scene having a visual object animation, such as a video of leaves falling from a tree.

Scenes may include a plurality of looped cycles. Each looped cycle within a scene may include a rendering of the animation one or more times. In order to avoid a predictable repetition of the animation, some scenes include randomized delays and durations. Randomized delays may include, for example, variable delays between animations renderings within the looped cycles. Randomized durations may include, for example, a variable duration time that an animation is rendered in each loop cycle. A random number generator may be used to identify these random delays and durations. In the present disclosure, the term "random" may refer to either random or pseudorandom, such that a "random number generator" may refer to either a random number generator or a pseudorandom number generator.

Some scenes include an undefined number of looped cycles. In other words, at the termination of each looped cycle, a new version of the looped cycle is added, with some randomization introduced to avoid the issue of predictable repetition. For example, prior to the beginning of each looped cycle, a random number generator may be used to determine a length of a delay or duration. While this may resolve the issue of predictable repetition, it also complicates determining which cycle in the scene was or will be active, or whether an animation will be in a rendered state at some specified time. In these systems, a simulator would need to run from the beginning of the scene to the specified time in order to determine which cycle will be active at the specified time and/or whether an animation will be in a rendered state at that time. To do this, a duration of each looped cycle in the scene would need to be calculated individually and aggregated using the random number generator.

The ability to determine which cycle in a scene will be active at a specified time and/or whether an animation within that scene will be in a rendered state at the specified time, is important for a number of different reasons. First, in scene authoring, creators may want to jump around in time to preview the scene and see what will be happening at any given point in time. In addition, a number of different computers are often used to implement these sensory systems. In the case of a computer going off-line or joining the system after a scene has started, it is important to be able to sync the computer with scene and the other computers in the network.

Aspects of the present disclosure address these and other shortcomings of prior approaches by creating a scene that includes a plurality of repeating segments. Each repeating segment may have a finite duration. Random delays and durations for the looped cycles within the repeating segment may be determined. In some embodiments, these values may be stored in a table. The table (which may represent a segment within the scene) may be repeated any number of times to generate a scene. In some aspects of the present disclosure, the table may enable a user to determine past or future cycles of a scene using fewer computations than prior approaches as simulations may not need to be run to determine each cycle of the scene. Alternatively, or additionally, using repeating segment of a scene to determine past or future cycles of the scene may be accomplished more quickly than prior approaches as the random delays may be precomputed and stored in the table instead of recomputed as the scene progresses from cycle to cycle, such that the tables may be similar to a look up table including loop delays, varying animations lengths, and/or other variables or delays.

For example, in one embodiment, a scene that includes a repeating segment may be created. The repeating segment may have a finite duration and may be separated into an identified number of looped cycles. Each looped cycle in the repeating segment may include a rendering of an animation and each looped cycle in the repeating segment may include a randomized loop delay such that a time between renderings of the animation within each looped cycle is not consistent. A duration of each looped cycle in the repeating segment may be aggregated to determine a total length of time of the repeating segment. Finally, the looped cycle in the scene that is active at a specified time may be determine based on the total length of time of the repeating segment.

Turning to the figures, FIG. 1A illustrates an exemplary scene 100, which proceeds temporally from left to right. The exemplary scene 100 includes a segment 102 that is repeated some number of times. The segment 102 may be repeated in the scene 100 any number of times. In some embodiments, the segment 102 may be repeated tens, hundreds, or thousands of times. The repeating segment 102 has a finite duration. In some embodiments, the content and duration of the repeating segment 102 may be consistent. In other words, each repeating instance of the segment 102 may be the same. For example, in FIG. 1A, the repeating segment 102 has a consistent time duration 104. The length of the time duration 104 can be any amount of time. In some embodiments, a repeating segment may last from a few minutes or a few hours to a few days or a few weeks. At the end of one segment, a new repeated segment may be initiated. Thus, the scene 100 may go on indefinitely.

FIG. 1B illustrates the segment 102 of FIG. 1A. As can be seen in FIG. 1B, the segment 102 includes a plurality of looped cycles 106a, 106b . . . 106n. The time durations of the looped cycles 106a, 106b . . . 106n are not consistent. For example, the looped cycle 106a has a time duration of 108a, the looped cycle 106b has a time duration of 108b . . . the looped cycle 106n has a time duration of 108n. Each of the looped cycles 106a, 106b . . . 106n includes a rendering of animations 110a, 110b . . . 110n. As can be seen in FIG. 1B, the animations 110a, 110b . . . 110n are not rendered at a consistent time within the looped cycles 106a, 106b . . . 106n. Indeed, the time durations 108a, 108b . . . 108n include three separate periods: first, an amount of time between a start of a looped cycle and a start of a rendering of the animation; second, a duration time of the animation; and third, and an amount of time between an end of the rendering of the animation and an end of the looped cycle.

In some embodiments, a looped cycle may always begin with the rendering of the animation. In these embodiments, a duration of a looped cycle may only include a duration time of the animation and an amount of time between an end of the rendering of the animation and an end of the looped cycle.

The amount of time between a start of a looped cycle and a start of a rendering of the animation and/or the amount of time between an end of the rendering of the animation and an end of the looped cycle may be referred to as a loop delay. A loop delay may be a randomized amount of time that is identified by a random number generator. A loop delay may include any amount of time. In some embodiments, a user may define limits on an amount of time possible for a loop delay. For example, a loop delay may be defined as between 1 second and 10 seconds. In other embodiments, the loop delay may be longer or shorter and may include fractions of time units, such as milliseconds.

The amount of time that an animation is rendered, or an "animation duration," may also be randomized. Similar to the loop delay, the animation duration may be a randomized amount of time that is generated by a random number generator. An animation duration may include any amount of time. In some embodiments, a user may define limits on an amount of time possible for an animation duration. For example, an animation duration may be defined as between 0.1 seconds and 1.5 seconds. In other embodiments, the animation duration may be longer or shorter and may also include fractions of time units.

FIG. 2 illustrates an example table 200 that represents a repeating segment of a scene. For example, the table 200 could represent the repeating segment 102, which is illustrated in FIGS. 1A and 1B. The table 200 may be used to determine a future or past cycle of a scene that employs a looping function, in accordance with at least one embodiment described in the present disclosure. In some embodiments, the table 200 may be constructed such that a repeating segment corresponding to the table 200 may be constructed using one or more values from the table 200.

The table 200 may include a table index column 202, a loop delay column 204, a cumulative loop delay column 206, a loop duration column 208, and a cumulative loop duration column 210. The table 200 may also include rows 212a, 212b, 212c, 212d, and 212e. Each of the rows 212a, 212b, 212c, 212d, and 212e may represent a different looped cycle within the repeating segment that is represented by table 200. For example, the rows 212a, 212b, 212c, 212d, and 212e may represent the looped cycles 106a, 106b . . . 106n shown in FIG. 1B. Each row 212a, 212b, 212c, 212d, and 212e may render at least one animation during the looped cycle.

A table that represents a repeating segment may include any number of rows, as a repeating segment may include any number of looped cycles. Some tables may include hundreds or thousands of rows. In some embodiments, the number of rows may be predetermined. For example, a user creating a segment to be repeated in a scene may determine a number of rows to be included in the table (or a number of looped cycles in a segment) before the table is populated. In another example, an algorithm or machine learning model may be used to determine a number of rows to be included in the table before the table is populated.

In some embodiments, increasing the number of rows in a table may cause an increase in the amount of memory that may be occupied by the table. In some embodiments, the amount of memory may be related to an amount of processing power used in making table computations and related computations using the table. For example, in instances in which a processing power is a first amount, the table size may include a size up to a first threshold amount. In instances in which the processing power is decreased, the size of the table may increase to be configured to provide similar results as the first amount of processing power. In these and other embodiments, a tradeoff may exist between the processing power and the memory (e.g., table size) relative to the table and accomplishing a task, such that if more memory is occupied, less processing power may be used.

In these and other embodiments, the size of the table may be arranged such that a scene may appear to be random and/or there may be difficulty in determining a repeating or looping characteristic of the scene.

With regard to table 200, the table index column 202 may assign an index value to each looped cycle in the repeating segment represented by the table 200. For example, a first looped cycle 212a may be associated with a row including 0 as the index value, a second looped cycle 212b may be associated with a row including 1 as the index value, and so forth. In another example, a first looped cycle may be associated with a row including 1 as the index value, a second cycle may be associated with a row including 2 as the index value, and so forth. In these and other embodiments, the index value may be based on a computer language that the table 200 is implemented in, a user preference, and/or any other arrangement for identifying rows in the table 200.

In some embodiments, the loop delay column 204 may include a length of delay before or after the rendering of an animation in the looped cycle. For example, in the repeating segment represented by the table 200, the animation is rendered at the beginning of each looped cycle. Thus, the values within the loop delay column 204 represent an amount of time from the end of the rendering of the animation to the end of the looped cycle.

In some embodiments, the loop delay may be expressed in seconds, or fractions thereof. Alternatively, or additionally, the delay length may be expressed by any unit of time. In these and other embodiments, the values in the loop delay column may be nonnegative values. In some embodiments, a table may include a uniform unit of time for each column that includes time-based elements. Alternatively, or additionally, a table may include a factor for converting-time based elements from a first column to time-based elements of a second column that may include a different unit of time. In these and other embodiments, the unit of time may be uniform for each element in a column. For example, a first element in the first row of a column may include the same unit of time as the last element in the last row of the column.

With regard to the table 200, the loop delays in column 204 are in seconds. Thus, the amount of delay after the rendering of the animation in the first looped cycle 212*a* and the end of the first looped cycle 212*a* is 3 seconds. The amount of delay after the rendering of the animation in the second looped cycle 212*b* and the end of the second looped cycle 212*b* is 9 seconds, and so on.

In other embodiments, the loop delay may be arranged to occur before an animation is rendered such that the animation is at the end of the looped cycle. The loop delay may include any number within a defined range. For example, the range may include any number between 0 and 10. In some embodiments, the loop delay may include natural numbers, rational numbers, irrational numbers, and/or other values for determining a length of the loop delay. In these and other embodiments, the user may determine the range for the loop delay.

In some embodiments, the values for the loop delay may include random numbers selected within the defined range as described herein. Alternatively, or additionally, the value for the loop delay may include random numbers that may be determined using a mathematical equation or a random number generator. In some embodiments, the loop delay values may include a uniform distribution over the defined range. Alternatively, or additionally, the loop delay values may include a normal distribution, a binomial distribution, and/or any other numerical distribution.

The cumulative loop delay values in the cumulative loop delay column 206 may include a running total of the loop delay values in the column 204 for each row. For example, the cumulative loop delay may include the loop delay value associated with a current looped cycle aggregated with the loop delay value(s) associated with previous cycle(s). In these and other embodiments, entries in the cumulative loop delay column 206 may include a running total of a combination, such as a summation, of the loop delay column 204, from the first entry in the table up to and including a current row in the table.

In some embodiments, the loop duration column 208 may identify a length of time of each looped cycle. Thus, the value in the loop duration column 208 may include the sum of an animation duration with the loop delay in the loop delay column 204. In these and other embodiments, the animation duration may include a nonnegative value. With regard to the repeating segment represented by the table 200, the animation duration has a static length of time that is ten seconds. Thus, the duration of the first looped cycle 212*a* is 13 seconds because the loop delay is 3 seconds and the animation duration is 10 seconds. The duration of the second looped cycle 212*b* is 19 seconds, and so on.

An animation duration may be any amount of time. In some embodiments, an animation duration may be five seconds, twenty seconds, or any other length of time. Alternatively, or additionally, the animation duration may include a variable length, as described in the table shown in FIG. 5. In these and other embodiments, the values in the loop duration column 208 may be nonnegative as both the loop delay and the animation length may be nonnegative.

In some embodiments, the cumulative loop duration column 210 may include the sum of a loop duration value of a given row with the loop duration value(s) of subsequent rows. For example, the cumulative loop duration may include the loop delay associated with a current looped cycle of the scene summed with the duration(s) of previous looped cycles. In these and other embodiments, entries in the cumulative loop duration column 210 may include a running total of a combination, such as a summation, of the loop duration column 208, from the first entry 212*a* in the table 200 up to and including the current row in the table 200. By combining a nonnegative loop duration value of a given row with a cumulative loop duration value of the current row, the entries in the cumulative loop duration column may be inherently sorted in ascending order.

In addition, the last value in the cumulative loop duration column 210 will represent the total length of time of the repeating segment represented by the table 200. With regard to the table 200, the total length of time of the repeating segment is 75 seconds.

In some embodiments, one or more values of one or more columns of the table 200 may be repopulated. For example, the entries in the loop delay column 204 may be repopulated with random values within a range that may have been previously defined, as described herein. In some embodiments, repopulating the table 200 may occur in response to a stimulus. For example, one or more columns of the table 200 may repopulated in response to a user input, a predetermined period of time, a completed number of repeated segment, and/or an external stimulus, such as received feedback from a sensor. For example, a user may observe one or more elements that are repeated (e.g., a recurring particular sound) and may determine one or more new random values in the table 200 may alter the repeated elements and the user may cause one or more columns of the table 200 to be repopulated. In another example, one or more columns of the table 200 may be periodically (e.g., at a predetermined time, or a random time) repopulated with new random values. In some embodiments, the frequency of the repopulations may be associated with the number of rows in the table 200. For example, a table with fewer rows may be configured to repopulate more frequently compared to a table with a greater number of rows. In these and other embodiments, repopulating one or more columns of the table 200 may contribute to the appearance of randomness of the scene.

In some embodiments, a random seed that may be used to generate the random values may be stored in the table or an associated memory location. The random seed may contribute to determining past or future cycles of the repeating segment in instances in which the table 200 is repopulated in a middle portion of the scene.

In some embodiments, the repeating segment represented by the table 200 may include one or more devices cycling the animations to create the scene. In some embodiments, devices may be added and synchronized with the scene by using the table to determine which cycle is the current cycle and/or the amount of time that may have passed within a cycle. Alternatively, or additionally, one or more devices may disconnect from the scene and upon reconnecting, may use the table to determine which cycle is the current cycle and/or the amount of time that may have passed within a cycle.

In a working example (which is provided in the table 200), a table may be generated that may include a predetermined number of rows. For example, the table 200 includes five rows indexed from zero to four. Random numbers may be selected, such as from a defined range, to populate at least one column of the table. For example, the values 3, 9, 7, 1, and 5 may be uniformly and/or randomly selected from the range zero to ten to populate the loop delay column 204. Various calculations may be performed on the random numbers in the loop delay column 204. For example, a first row 212a in the cumulative loop delay column 206 may be determined to be 3, a second row 212b in the cumulative loop delay column 206 may be determined to be 12 by adding 9 to 3, a third row 212c in the cumulative loop delay column 206 may be determined to be 19 by adding 7 to 12, and so forth.

The loop duration column 208 may include the loop delay column 204 entries added with a length of the animation, which, in the table 200, is 10. As such, the entries in the loop duration column 208 may be 13, 19, 17, 11, and 15, respectively. A first row 212a in the cumulative loop duration column 210 may be determined to be 13, a second row 212b in the cumulative loop duration column 210 may be determined to be 32 by adding 19 to 13, and so forth.

Using the table, various cycles of the repeating segment that is represented by the table 200 may be determinable using mathematic operations and calculations. For example, using the table of FIG. 2 and attempting to determine what cycle the repeating segment may be at 500 seconds in the future, 500 may be divided by 75 (the total length of time of the segment) to yield 6 with a remainder of 50. As the cumulative loop duration column 210 is inherently sorted in ascending order (by way of each successive row including a nonnegative value added to the previous row), it may quickly be determined that the segment has been repeated 6 full times, and the current cycle is 1 second into the fourth row (or looped cycle) 212d (e.g., 50 seconds of remainder minus 49 seconds from the cumulative loop duration nearest and less than the remainder). The determination may be performed by a search algorithm, such as a binary search algorithm, or other searching algorithm. It may also be determined the number of cycles that have already completed is equal to 33 (the yield of 6 multiplied by 5, e.g., the number of rows in the table, yielding 30 and adding 3 for the last completed row, which is table index 2 in this example).

In addition, a determination may be made as to whether the animation will be in a rendered state at a specified time by evaluating the loop delay and the animation duration. In the previous example, it was determined that the current cycle 500 seconds in the future is 1 second into the fourth row (or looped cycle) 212d. Because the animation duration is 10 seconds and the animation starts each looped cycle, a determination can be made that the animation will be in a rendered state 500 seconds in the future.

Modifications, additions, or omissions may be made to the table without departing from the scope of the present disclosure. For example, in some embodiments, the table 200 may include more or less columns than those illustrated in FIG. 2 and more or less rows that those illustrated in FIG. 2. For example, the loop duration column 208 may be computed on the fly and may not be stored in the table. Alternatively, or additionally, the table may include additional delays such as a start delay.

Figure 3:
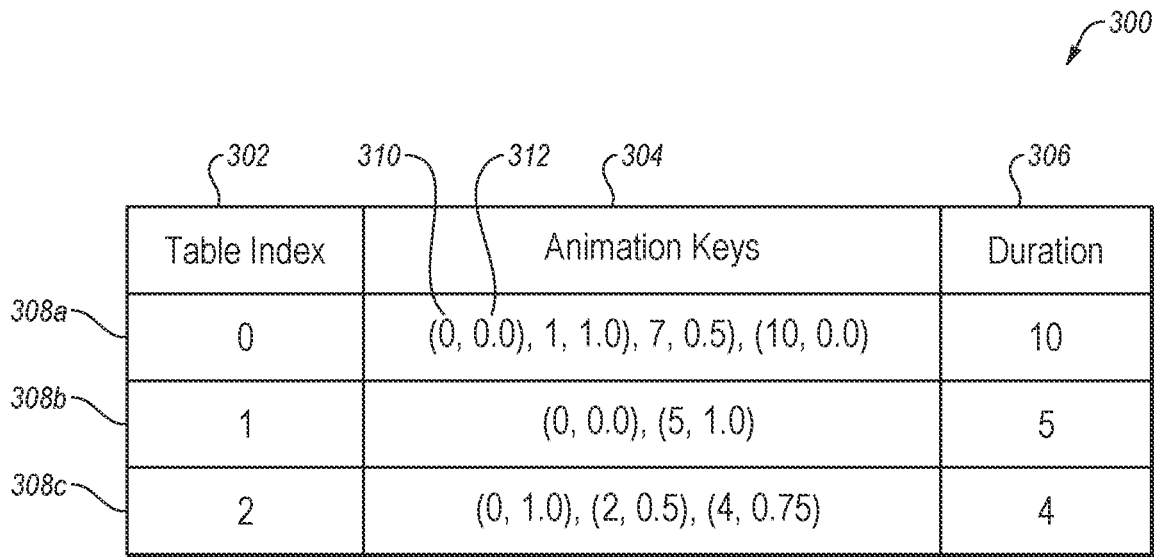
FIG. 3 illustrates another example table that may be used to determine a future or past cycle of a scene that employs a looping function.

FIG. 3 illustrates an example table 300 that may be used to determine a future or past cycle of a scene that employs a looping function, in accordance with at least one embodiment described in the present disclosure. The table 300 illustrates a number of animations that may be rendered in a scene such that the animations may include variable lengths in order to contribute to the randomness of the scene. In some embodiments, the table 300 may include a table index column 302, an animation keys column 304, and a duration column 306.

In some embodiments, the table index column 302 may include an index value associated with each animation rendered in a repeating segment of a scene. For example, a first animation is associated with a first row 308a, which includes 0 as the index value. A second animation is associated with a second row 308b, which includes 1 as the index value. A third animation is associated with a third row 308c, which includes 2 as the index value.

The animation keys column 304 may include one or more key-value pairs in each row. The key-value pairs may include a first time 310 element paired with a property element 312. For example, a key-value pair (0, 1.0) may indicate at time 0, a property of the animation may be equal to 1.0. This property may be a volume level of a sound object, or a color of a visual object, etc. The value of the property may indicate a specific level within the property.

In some embodiments, the number of key-value pairs in each row may differ. For example, as illustrated in table 300, the first row 308a includes four key-value pairs, the second row 308b includes two key-value pairs, and the third row 308c includes three key-value pairs. Alternatively, or additionally, one or more rows of the table may include an equal number of key-value pairs.

In some embodiments, the duration column 306 may include a duration value that may indicate the animation duration. For example, a duration value of 10 in the duration column may indicate the animation may be ten seconds in length. In some embodiments, the duration value may be associated with the key-value pair in the adjacent column (e.g., the animation keys column) of the same row. For example, as illustrated, the last key-value pair in the first row 308a of the animation keys includes the property of 0.0 at time 10, where 10 is also the value of the first row 308a of the duration column 306. Alternatively, or additionally, the duration value may be greater than any of the time elements in the key-value pairs in the animation keys column.

Modifications, additions, or omissions may be made to the table without departing from the scope of the present disclosure. For example, in some embodiments, the table may include any number of other components that may not be explicitly illustrated or described.

Figure 4:
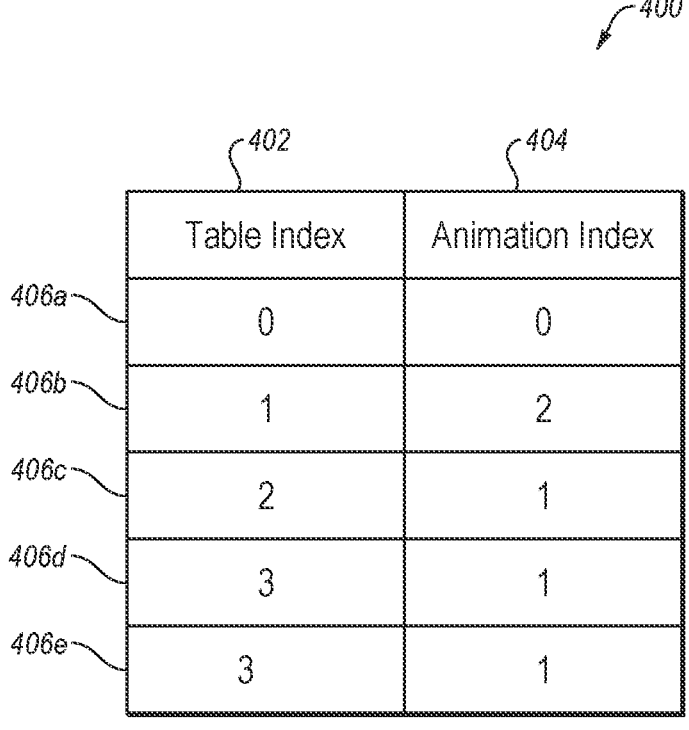
FIG. 4 illustrates another example table that may be used to determine a future or past cycle of a scene that employs a looping function.

FIG. 4 illustrates an example table 400 that may be used to determine a future or past cycle of a scene that employs a looping function, in accordance with at least one embodiment described in the present disclosure. The table 400 may illustrate a random selection of animations, such as animations included in the table 300. In some embodiments, the table 400 may include a table index column 402 and an animation index column 404.

In some embodiments, the table index column 402 may include an index value associated with an animation index that may be used in a repeating segment of a scene. For example, a first animation index may be associated with a first row 406a, which includes 0 as the index value. A second animation index may be associated with a second row 406b, which includes 1 as the index value, and so on.

The animation index may include a reference or pointer to another data object, such as the table 300. For example, a 0 in the animation index column 404 may refer to the row of the table 300 that has a table index value of 0. Thus, the first row 406*a* of table 400 may point to the first row 308*a* of the table 300, which has a table index of 0, in which the animation includes a duration length of 10 and includes four key-value pairs.

Modifications, additions, or omissions may be made to the table without departing from the scope of the present disclosure. For example, in some embodiments, the table may include any number of other components that may not be explicitly illustrated or described.

FIG. 5 illustrates an example table 500 that may be used to determine a future or past cycle of a scene that employs a looping function, in accordance with at least one embodiment described in the present disclosure. The table 500 may include a table index column 502, a loop delay column 504, a cumulative loop delay column 506, an animation index column 508, an animation duration column 510, a cumulative animation duration column 512, a loop duration column 514, and a cumulative loop duration column 516. The table 500 also includes rows 520*a*, 520*b*, 520*c*, 520*d*, and 520*e*.

In some embodiments, one or more columns of the table 500 may be the same or similar to one or more columns of the table 200. For example, the table index column 502 of table 500 may have the same value as and perform the same function as the table index column 202 of table 200. The loop delay column 504 of table 500 may have the same value as and perform the same function as the loop delay column 204 of table 200. The cumulative loop delay column 506 of table 500 may have the same value as and perform the same function as the cumulative loop delay column 206 of table 200. While the values in the loop duration column 514 of table 500 are not the same as the values in the loop duration column 208 of table 200, these columns may perform the same function, namely to provide a duration of each loop. Similarly, while the values in the cumulative loop duration column 516 of table 500 are not the same as the values in the cumulative loop duration column 210 of table 200, these columns may perform the same function, namely to provide a cumulative duration of a current loop and all previous loops.

Unlike the table 200, the table 500 includes the animation index column 508, the animation duration column 510, and the cumulative animation duration column 512. Thus, in addition to a randomized loop delay, the repeating segment that is represented by the table 500 also has a randomized animation duration.

The animation index column 508 and the animation duration column 510 may be populated based on data from another table, such as the tables 400 and 300, respectively. Alternatively, or additionally, the animation index column 508 and the animation duration column 510 may be obtained from a random number generator, a data storage, such as a database, user input, and/or other data sources.

In some embodiments, the cumulative animation duration values in the cumulative animation duration column 512 may include a combination of an animation duration value of a given row 520*a*, 520*b*, 520*c*, 520*d*, and 520*e* with the animation duration value(s) of subsequent rows. For example, a cumulative animation duration value may include the animation duration associated with a current cycle of the scene summed with the animation duration(s) associated with previous cycle(s) of the repeating segment. In these and other embodiments, entries in the cumulative animation duration column 512 may include a running total of a combination, such as a summation, of the animation duration column, from the first entry 520*a* in the table 500 up to and including the current row (e.g., table index) in the table.

Using the table 500, various cycles of the segment may be determinable using mathematic operations and calculations. For example, using the table 500 and attempting to determine what cycle the scene may be at 500 seconds in the future, 500 may be divided by 58, which the total length of time of a scene represented by the table 500 and is illustrated by the entry in the last row 520*e* of the cumulative loop duration column 516, to yield 8 with a remainder of 36. As the cumulative loop duration column 516 is sorted in ascending order, it may quickly be determined that the segment has been repeated 8 full times, and the current cycle is 10 seconds into the third row 520*c*, which has a table index value 2 (e.g., 36 seconds of remainder minus 26 seconds from the cumulative loop duration nearest and less than the remainder). It may also be determined the number of cycles of the segment that have already completed is equal to 42 (the yield of 8 multiplied by 5, e.g., the number of rows in the table, yielding 40 and adding 2 for the last completed row, which is the row 520*b*, which has a table index value 1 in this example).

Figure 6:
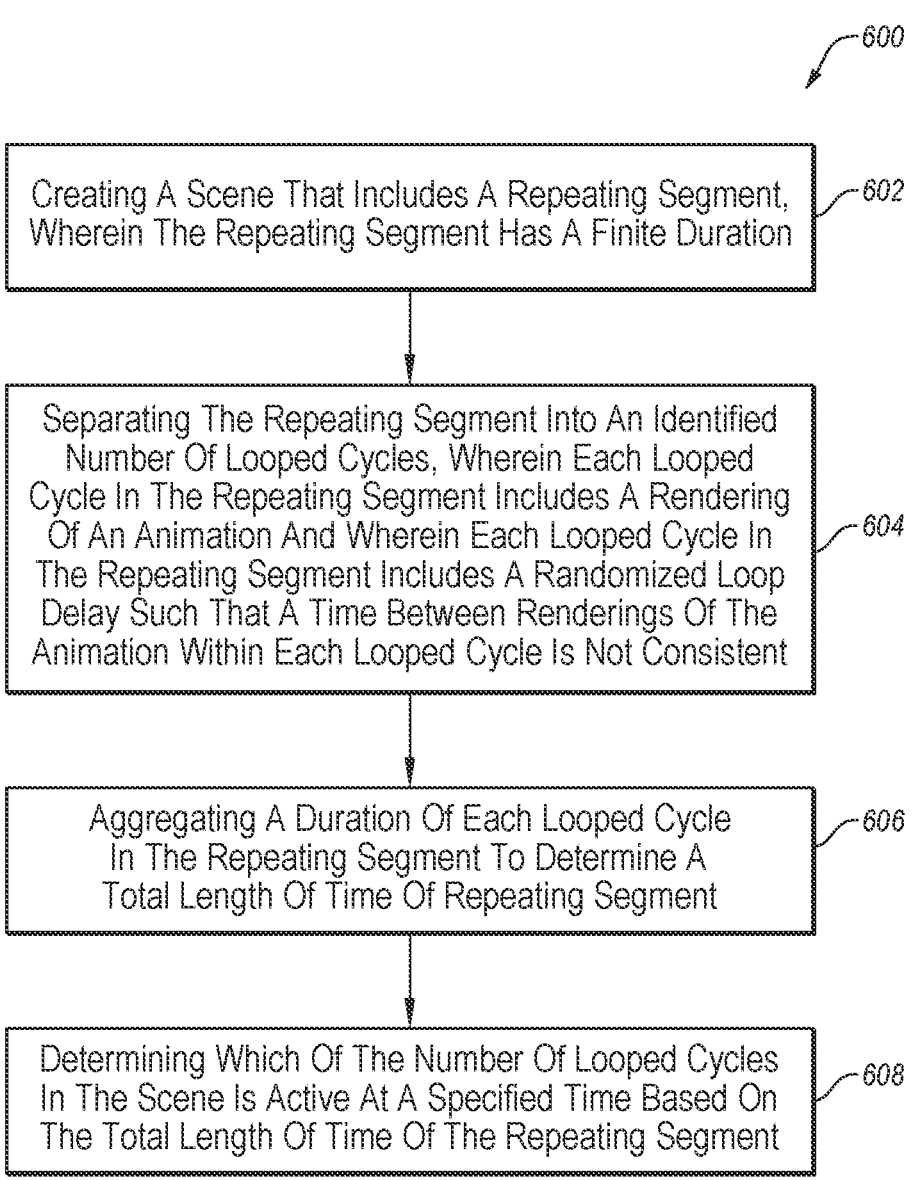
FIG. 6 is a flowchart of an example method for determining a future or past cycle of a scene that employs a looping function.

FIG. 6 is a flowchart of an example method 600 for determining a future or past cycle of a scene that employs a looping function, in accordance with at least one embodiment described in the present disclosure. The method 600 may be performed by one or more processors based on one or more computer-readable instructions stored on one or more non-transitory computer-readable media.

The method 600 may include, at action 602, creating a scene that includes a repeating segment, wherein the repeating segment has a finite duration. For example, the repeating segment may include one or more animations and may have any length of time, so long as the time is not indefinite. The one or more animations may be any sensory object, such as an audible object, a visual object, or some combination of sensory objects.

The method 600 may include, at action 604, separating the repeating segment into an identified number of looped cycles, wherein each looped cycle in the repeating segment includes a rendering of the animation and wherein each looped cycle in the repeating segment includes a randomized loop delay such that a time between renderings of the animation within each looped cycle is not consistent. In some embodiments, a random number generator may be used to identify the loop delay. In some embodiments, a duration time of the rendering of the animation in each looped cycle may also be randomized. In these embodiments, the random number generator may also be used to identify the duration time of the rendering of the animation in each looped cycle.

The method 600 may include, at action 606, aggregating a duration of each looped cycle in the repeating segment to determine a total length of time of the repeating segment. In some embodiments, each looped cycle in the repeating segment may have a duration that is equal to an amount of time between a start of a looped cycle and a start of a rendering of the animation, a duration time of the animation, and an amount of time between an end of the rendering of the animation and an end of the looped cycle. Thus, to aggregate total length of time of the repeating segment first requires calculating the amount of time of each individual looped cycle.

Finally, the method 600 may include, at action 608, determining which of the number of looped cycles in the scene is active at a specified time based on the total length of time of the repeating segment. In addition to determining which of the looped cycles will (or was) active at an identified time, a determination may also be made as to whether the animation will be in a rendered state at the specified time. To do this, an evaluation of the animation duration and loop cycle duration may be performed to determine whether the specified time lands on a portion of the looped cycle when the animation is being rendered.

The method 600 may thus be employed, in some embodiments, to determine a future or past cycle of a repeating segment that employs a looping function. Using the method 600 to determine a future or past cycle of a scene that employs a looping function, running a long and resource intensive simulation to determine this information on a scene that does not include a number of repeating segments can be avoided. This information may be determined quickly and accurately for any desire point of time, regardless of how far in the future or the past the desired point of time is. The required time to determine the future or past cycle of a scene, or whether an animation will be actively rendered, is the same regardless of the desired point in time. This allows scene creators, during a scene authoring process, to go to any point in time in the scene to see what looped cycle will be active and whether an animation will be rendered.

Although the actions of the method 600 are illustrated in FIG. 6 as discrete actions, various actions may be divided into additional actions, combined into fewer actions, reordered, expanded, or eliminated, depending on the desired implementation. Also, in some embodiments, the method 600 may be performed without randomizing the loop delay as recited in action 604. In these embodiments, instead of randomizing the loop delay, an animation duration alone may be randomized.

Further, it is understood that the method 600 may improve the functioning of a computer system itself. For example, the functioning of a computing device that performs one or more of the steps of the method 600 may be more efficient. This is because determining a future or past cycle of a scene that employs a looping function as provided in the method 600 eliminates the need to perform a simulation to determine this information for a scene that does not have a finite duration. Avoiding the need to perform this resource intensive simulation will improve the functionality of a computing device, as these resources may be allocated elsewhere. The method 600 may reduce the number of steps required to determine a future or past cycle of a scene that employs a looping function as a calculation based on data that may be contained in a table may be used and a complicated simulation avoided.

Figure 7:
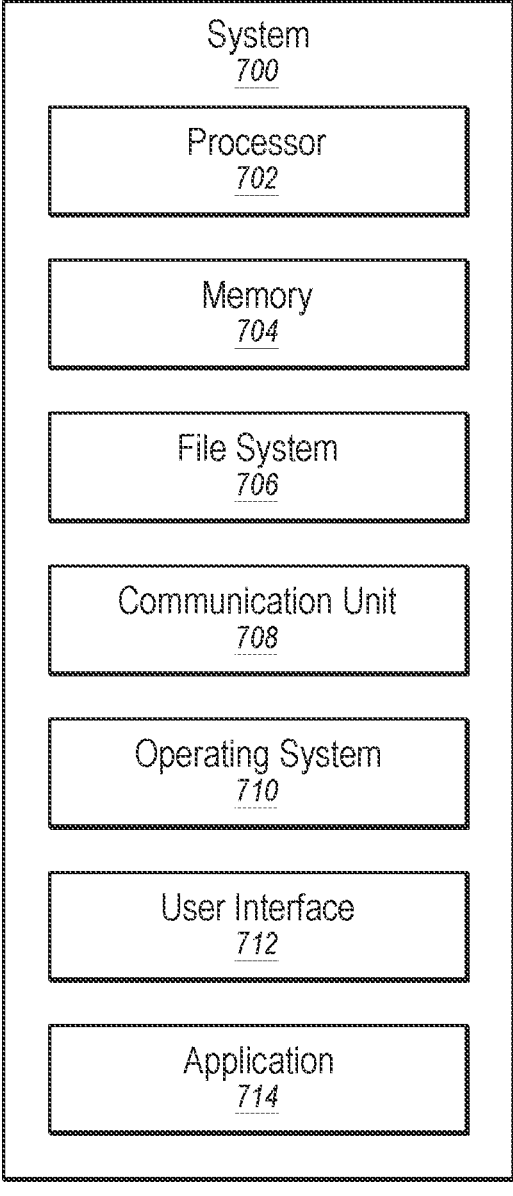
FIG. 7 illustrates an example computer system that may be employed in determining a future or past cycle of a scene that employs a looping function.

FIG. 7 illustrates an example computer system 700 that may be employed in determining a future or past cycle of a scene that employs a looping function, in accordance with at least one embodiment described in the present disclosure. In some embodiments, the computer system 700 may be part of any of the systems or devices described in this disclosure. For example, the computer system 700 may perform one or more of the steps recited in the method 600.

The computer system 700 may include a processor 702, a memory 704, a file system 706, a communication unit 708, an operating system 710, a user interface 712, and an application 714, which all may be communicatively coupled. In some embodiments, the computer system may be, for example, a desktop computer, a client computer, a server computer, a mobile phone, a laptop computer, a smartphone, a smartwatch, a tablet computer, a portable music player, a networking device, or any other computer system.

Generally, the processor 702 may include any suitable special-purpose or general-purpose computer, computing entity, or processing device including various computer hardware or software applications and may be configured to execute instructions stored on any applicable computer-readable storage media. For example, the processor 702 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 702 may interpret and/or execute program instructions and/or process data stored in the memory 704 and/or the file system 706. In some embodiments, the processor 702 may fetch program instructions from the file system 706 and load the program instructions into the memory 704. After the program instructions are loaded into the memory 704, the processor 702 may execute the program instructions. In some embodiments, the instructions may include the processor 702 performing one or more of the actions of the methods disclosed herein.

The memory 704 and the file system 706 may include computer-readable storage media for carrying or having stored thereon computer-executable instructions or data structures. Such computer-readable storage media may be any available non-transitory media that may be accessed by a general-purpose or special-purpose computer, such as the processor 702. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 702 to perform a certain operation or group of operations, such as one or more of the actions of the methods disclosed herein. These computer-executable instructions may be included, for example, in the operating system 710, in one or more applications, or in some combination thereof.

The communication unit 708 may include any component, device, system, or combination thereof configured to transmit or receive information over a network. In some embodiments, the communication unit 708 may communicate with other devices at other locations, the same location, or even other components within the same system. For example, the communication unit 708 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 708 may permit data to be exchanged with a network and/or any other devices or systems, such as those described in the present disclosure.

The operating system 710 may be configured to manage hardware and software resources of the computer system 700 and configured to provide common services for the computer system 700.

The user interface 712 may include any device configured to allow a user to interface with the computer system 700. For example, the user interface 712 may include a display, such as an LCD, LED, or other display, that is configured to present video, text, application user interfaces, and other data as directed by the processor 702. The user interface 712 may further include a mouse, a track pad, a keyboard, a touchscreen, volume controls, other buttons, a speaker, a microphone, a camera, any peripheral device, or other input or output device. The user interface 712 may receive input from a user and provide the input to the processor 702. Similarly, the user interface 712 may present output to a user.

The application 714 may be one or more computer-readable instructions stored on one or more non-transitory computer-readable media, such as the memory 704 or the file system 706, that, when executed by the processor 702, is configured to perform one or more of the actions of the methods disclosed herein. In some embodiments, the application 714 may be part of the operating system 710 or may be part of an application of the computer system 700, or may be some combination thereof.

Modifications, additions, or omissions may be made to the computer system 700 without departing from the scope of the present disclosure. For example, although each is illustrated as a single component in FIG. 7, any of the components 702-714 of the computer system 700 may include multiple similar components that function collectively and are communicatively coupled. Further, although illustrated as a single computer system, it is understood that the computer system 700 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 702 of FIG. 7) including various computer hardware or software applications, as discussed in greater detail below. Further, as indicated above, embodiments described herein may be implemented using computer-readable media (e.g., the memory 704 or file system 706 of FIG. 7) for carrying or having computer-executable instructions or data structures stored thereon.

In some embodiments, the different components and applications described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absent a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

What is claimed is:

1. A method for determining a future or past cycle of a scene that employs a looping function, the method comprising:

creating a scene that includes a repeating segment, wherein the repeating segment has a finite duration;

separating the repeating segment into an identified number of looped cycles, wherein each looped cycle in the repeating segment includes a rendering of an animation and wherein each looped cycle in the repeating segment includes a randomized loop delay such that a time between renderings of the animation within each looped cycle is not consistent, wherein a random number generator is used to identify the loop delay;

prior to rendering the scene, aggregating a duration of each looped cycle in the repeating segment to determine a total length of time of the repeating segment, wherein the random number generator is used to determine the total length of time of the repeating segment; and determining which of the number of looped cycles in the scene is actively being rendered at a specified time based on the total length of time of the repeating segment as determined prior to the rendering of the scene.

2. The method of claim 1, wherein the animation is an audible object.

3. The method of claim 1, wherein the animation is a visual object.

4. The method of claim 1, wherein each looped cycle in the repeating segment has a duration that is equal to an amount of time between a start of a looped cycle and a start of a rendering of the animation, a duration time of the animation, and an amount of time between an end of the rendering of the animation and an end of the looped cycle.

5. The method of claim 4, wherein:

the duration time of the rendering of the animation in each looped cycle is also randomized, and the random number generator is used to identify the duration time of the rendering of the animation in each looped cycle.

6. The method of claim 1, further comprising:

determining whether the animation will be in a rendered state at the specified time.

7. One or more non-transitory computer-readable media comprising one or more computer-readable instructions that, when executed by one or more processors of a computing device, cause the computing device to perform a method for determining a future or past cycle of a scene that employs a looping function, the method comprising:

creating a scene that includes a repeating segment, wherein the repeating segment has a finite duration;

separating the repeating segment into an identified number of looped cycles, wherein each looped cycle in the repeating segment includes a rendering of an animation and wherein each looped cycle in the repeating segment includes a randomized loop delay such that a time between renderings of the animation within each looped cycle is not consistent, wherein a random number generator is used to identify the loop delay;

prior to rendering the scene, aggregating a duration of each looped cycle in the repeating segment to determine a total length of time of the repeating segment, wherein the random number generator is used to determine the total length of time of the repeating segment; and determining which of the number of looped cycles in the scene is actively being rendered at a specified time based on the total length of time of the repeating segment as determined prior to the rendering of the scene.

8. The one or more non-transitory computer-readable media of claim 7, wherein the animation is an audible object.

9. The one or more non-transitory computer-readable media of claim 7, wherein the animation is a visual object.

10. The one or more non-transitory computer-readable media of claim 7, wherein each looped cycle in the repeating segment has a duration that is equal to an amount of time between a start of a looped cycle and a start of a rendering of the animation, a duration time of the animation, and an amount of time between an end of the rendering of the animation and an end of the looped cycle.

11. The one or more non-transitory computer-readable media of claim 10, wherein:

the duration time of the rendering of the animation in each looped cycle is also randomized, and the random number generator is used to identify the duration time of the rendering of the animation in each looped cycle.

12. The one or more non-transitory computer-readable media of claim 7, further comprising:

determining whether the animation will be in a rendered state at the specified time.

13. A computing device comprising:

one or more processors; and one or more non-transitory computer-readable media comprising one or more computer-readable instructions that, when executed by the one or more processors, cause the computing device to perform a method for determining a future or past cycle of a scene that employs a looping function, the method comprising:

creating a scene that includes a repeating segment, wherein the repeating segment has a finite duration;

separating the repeating segment into an identified number of looped cycles, wherein each looped cycle in the repeating segment includes a rendering of an animation and wherein each looped cycle in the repeating segment includes a randomized loop delay such that a time between renderings of the animation within each looped cycle is not consistent, wherein a random number generator is used to identify the loop delay;

prior to rendering the scene, aggregating a duration of each looped cycle in the scene to determine a total length of time of the repeating segment, wherein the random number generator is used to determine the total length of time of the repeating segment; and determining which of the number of looped cycles in the scene is actively being rendered at a specified time based on the total length of time of the repeating segment as determined prior to the rendering of the scene.

14. The computing device of claim 13, wherein the animation is an audible object.

15. The computing device of claim 13, wherein each looped cycle in the repeating segment has a duration that is equal to an amount of time between a start of a looped cycle and a start of a rendering of the animation, a duration time of the animation, and an amount of time between an end of the rendering of the animation and an end of the looped cycle.

16. The computing device of claim 15, wherein:

the duration time of the rendering of the animation in each looped cycle is also randomized, and the random number generator is used to identify the duration time of the rendering of the animation in each looped cycle.

17. The computing device of claim 13, further comprising:

determining whether the animation will be in a rendered state at the specified time.

*     *     *     *     *